US006178238B1

(12) United States Patent
Bozek et al.

(10) Patent No.: US 6,178,238 B1
(45) Date of Patent: Jan. 23, 2001

(54) SPEED CALLING WHEN AWAY FROM HOME

(75) Inventors: Barbara Ann Bozek, Naperville; James Lee Turner, Lemont, both of IL (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/058,094

(22) Filed: Apr. 9, 1998

(51) Int. Cl.$^7$ .................................................. H04M 3/44
(52) U.S. Cl. ............................................ 379/207; 379/216
(58) Field of Search .................................... 379/216, 144, 379/114, 355, 356, 207; 455/563, 564

(56) References Cited

U.S. PATENT DOCUMENTS

| 4,802,199 | * | 1/1989 | Lange et al. | 379/221 |
| 4,899,373 | * | 2/1990 | Lee et al. | 379/207 |
| 5,222,120 | * | 6/1993 | McLeod et al. | 379/88.24 |
| 5,555,290 | * | 9/1996 | McLeod et al. | 379/67 |
| 5,577,110 | * | 11/1996 | Aquino | 379/201 |
| 5,703,942 | * | 12/1997 | Pinard et al. | 379/207 |

* cited by examiner

Primary Examiner—David R. Hudspeth
Assistant Examiner—Harold Zintel
(74) Attorney, Agent, or Firm—Werner Ulrich

(57) ABSTRACT

An arrangement for permitting callers to make speed dialing calls away from their home telephone. A speed dialing list is maintained for those who subscribe to this service for a particular telephone line. When the caller who normally uses that line and makes use of his/her speed dialing feature from that line, and is away from his/her telephone, speed dialing service can be obtained if the call is a calling card, or credit/debit card telephone call. Such calls are routed initially to a switch for serving such calls. This switch then queries a calling card or credit card data base to obtain either a number corresponding to the caller's speed calling number, or to obtain an identification of the switch which contains that caller's speed dialing list. The caller is identified by his/her calling card, or credit/debit card number. If the data base provides a number, or other data for directly deriving the destination number corresponding to a speed dialed number, then the calling card server switch can complete the call to that number. Otherwise, the calling card server switch queries the caller's home switch to obtain the required speed dialing information, and then completes the call. Advantageously, this arrangement allows callers who may have forgotten the directory number corresponding to a speed calling number, to use their speed calling feature along with credit card calls even when they are away from their home telephone. Additionally, this type of arrangement can be used to allow callers to call their home telephone by providing their calling card number plus an indication, such as # or *; the calling card number is used to access a data base to provide the telephone number of the home telephone of the calling card holder.

6 Claims, 2 Drawing Sheets

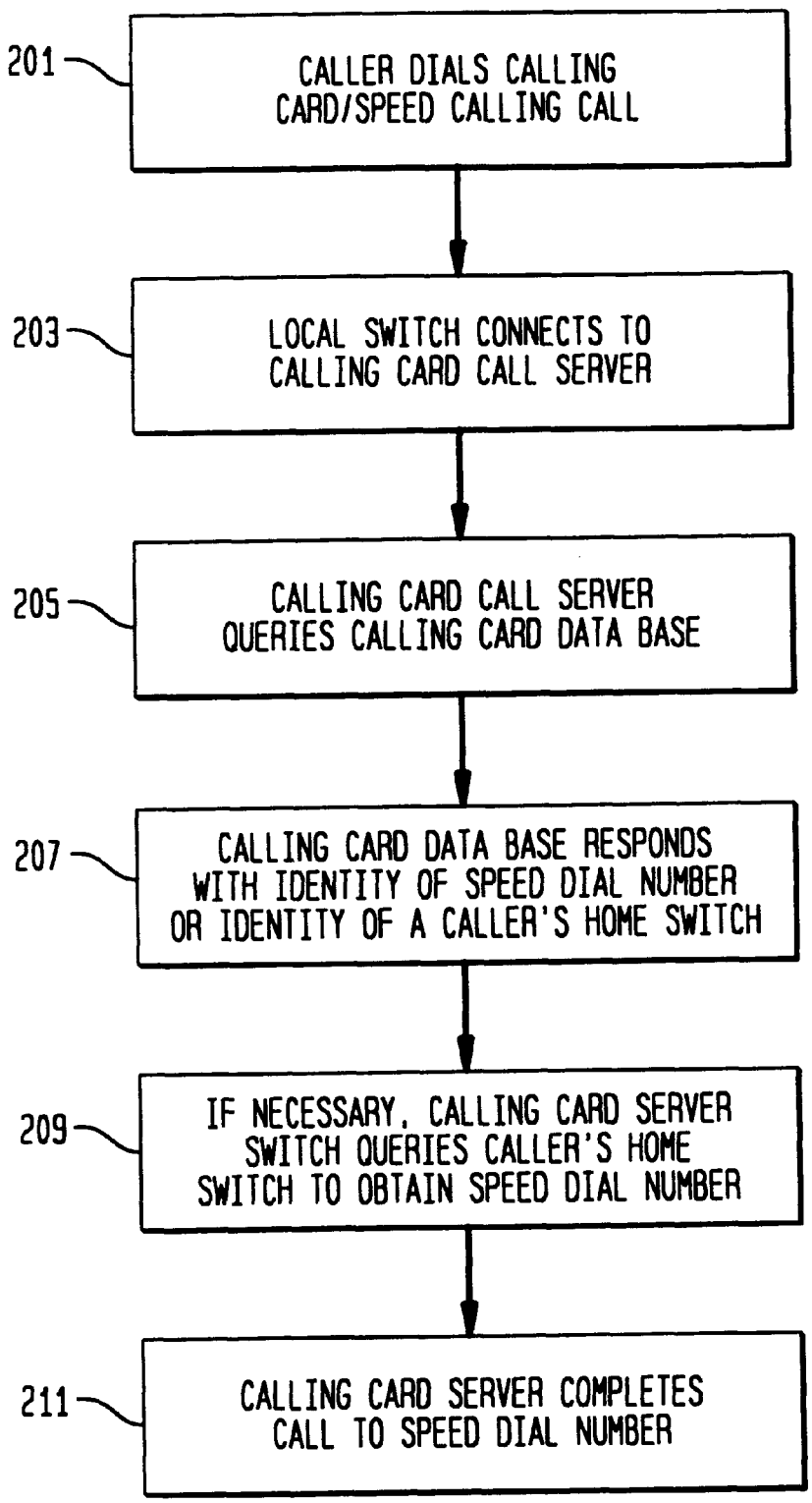

SPEED CALLING WHEN AWAY FROM HOME

TECHNICAL FIELD

This invention relates to apparatus and method for allowing telephone subscribers to use speed dialing even when they are not calling from their home telephone.

Problem

Speed calling is a service which allows telephone customers to call some of their most frequently dialed numbers by specifying only a one or two digit number. The service has become quite popular and is likely to become even more popular as ten digit dialing becomes more and more prevalent.

People who use speed calling, after a while, tend to forget the number of the party associated with ones of their speed dialing numbers because they no longer use the full number when they dial that party. This is fine as long as callers are calling from their home telephone, but if they are traveling, the switch connected to their phone when they are away from home has no record of their speed dialing list, and so cannot complete a speed dialed call to the right party.

Solution

We have recognized that a problem of the prior art, therefore, is that there is no satisfactory way of using speed dialing when not connected to the caller's home switch. The above problem is solved, and an advance is made over the prior art in accordance with our invention wherein when a caller makes a calling card type of call, the switch serving that call identifies the caller using the caller's card number, and uses that identification to obtain the caller's speed calling list which will allow the serving switch to identify the destination of a speed calling call, and to establish a connection to the appropriate terminating number. Since many of the calls that people make when they are away from their home telephone are calling card calls, this arrangement advantageously allows speed calling to be utilized with a minimum of caller inconvenience even when the caller is away from his/her home telephone.

In accordance with one preferred embodiment of the invention, the calling card data base maintains an up-to-date speed calling list for all the customers whose calling cards are served by that data base. With this arrangement, when the calling card data base is accessed in order to authenticate the calling card and check whether that calling card is allowed to make a call, the identity of the destination is, provided along with the authentication information so that the serving switch for the calling card call can arrange to have the call completed. In accordance with another embodiment of Applicants' invention, the calling card data base which contains the home telephone number corresponding to the calling card provides that home telephone number to the calling card serving switch, which then queries the home switch to obtain either the speed calling list, or the specific speed calling entry corresponding to the speed calling number dialed by the caller. Advantageously, the second embodiment avoids the necessity for storing speed calling lists twice, but delays the call setup because of the time required to make the query of the home switch.

In accordance with another aspect of Applicants' invention, if the caller uses a credit card instead of a calling card (e.g., Master Card instead of an A T & T calling card), then the query of the credit card data base returns the directory number of the caller which can then be used for querying the data base of the home switch.

In accordance with another aspect of Applicants' invention, a caller using a calling card or credit card and a special indication, such as # or *, may specify that the call is to be completed to the caller's home station.

For services such as call A T T, which use extensive prompts, a prompt may also be used to obtain the caller's home telephone number in order to identify the home switch so that a query of that switch may be made in order to obtain the caller's speed dialing list.

BRIEF DESCRIPTION OF THE DRAWINGS

FIG. 2 is a flow diagram illustrating the steps performed in implementing Applicants' invention.

DETAILED DESCRIPTION

Figure 1:
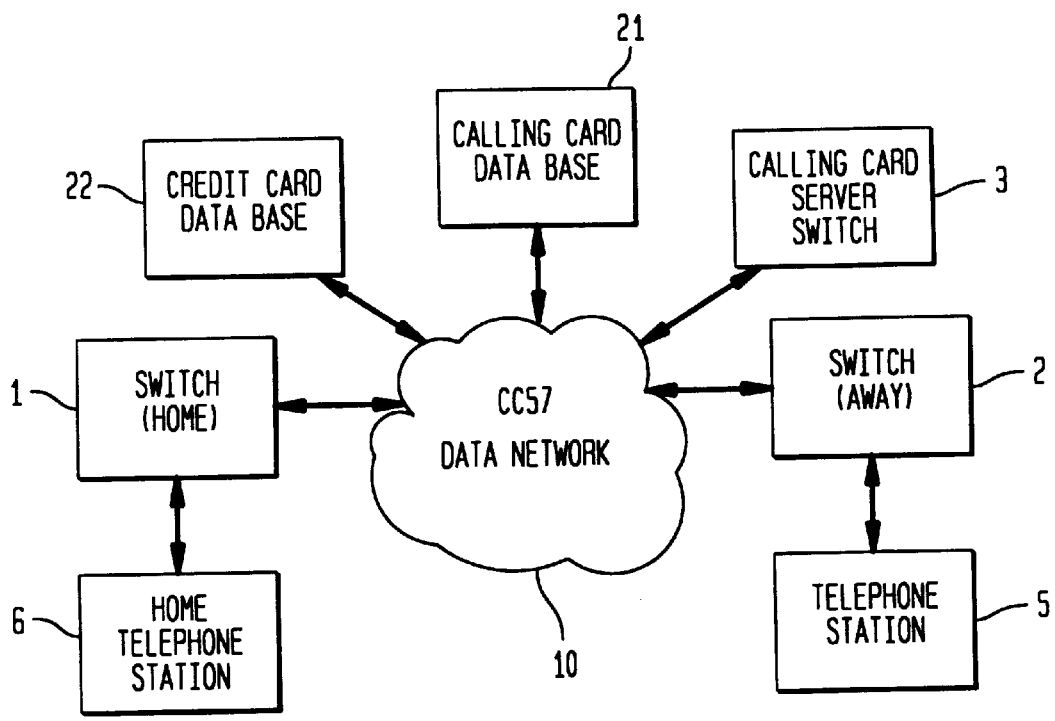
FIG. 1 is a block diagram illustrating the system used for implementing Applicants' invention.

FIG. 1 is a block diagram illustrating Applicants' invention. A caller at telephone station 5 is connected to a switch 2, which is not the switch that normally serves the caller of a calling card call. The switch that normally serves that caller is switch 1 (the home switch). A calling card server switch 3 is used for serving calling card calls. In some cases, the calling card server switch is the same as the away switch if the away switch is, for example, a 5 ESS® switch equipped with operator service position system (OSPS) features. Alternatively, the switch can be a separate switch either dedicated to operator services, or performing operator services as well as other services. In FIG. 1, the calling card server switch 3 is such a switch. A calling card data base 21 is a data base for storing information associated with a large number of calling cards. Similarly, credit card data base 22, is a data base used for storing data for a large number of credit cards (and/or debit cards), but is a data base which is less oriented toward the telephone function. The switches and data bases are interconnected by a data network 10, which is Applicants' preferred embodiment, is a CCS 7 data network. The switches are interconnected by a telecommunications network not shown. The s witches and data base are al program controlled and carry out their assigned functions under the control of a program. The switches and data base therefore are a means for carrying out the functions required to implement this invention.

When the caller at telephone station 5 makes a calling card call, the caller is switched through switch 2 to calling card server switch 3, which receives dialing information from the telephone station. The dialing information may include a speed dialing number for which the calling card service switch has no speed dialing list. It is important to remember that speed dialing lists are kept only for telephones served by a particular switch, and identified by that switch, and that the speed calling list for example, telephone station 5, if there is such a list, is not the list that the caller wants to use. That list is maintained in the caller's home switch 1.

When the calling card server switch receives a speed dialing number, and has received a calling card number, the calling card server switch accesses the calling card data base 21 via the CCS 7 data network 10. The calling card data base responds with the data normally provided for a calling card call, and if the calling card data base is also equipped to maintain speed dialing lists for all calling cards that it serves, the calling card data base returns either the speed dialing list, or the specific entry corresponding to the caller's called speed dialed number. The speed dialed number is used by the calling card service switch to establish the call. In case the calling card data base does not maintain a speed calling list for the caller's calling card number, the calling card data base returns the caller's home telephone number, and the calling card server switch then queries switch 1 to obtain the caller's speed dialing list, or specific speed dialing number.

If the caller had used a credit card number instead of a calling card number, then the calling card server switch 3 would query the credit card data base 22 from which it would obtain authorization information as well as information for identifying the caller's home switch; the most straight forward identification information is the caller's home telephone number.

Additionally, even for callers who do not have speed calling service, the calling card server switch can use the access to, or via the calling card or credit card data base to determine the caller's home telephone number, i.e., the telephone number of the owner of the calling or credit card. The caller can provide any unique signal, such as # or *, possibly with addition al digits, possibly in response to prompts from the calling card server switch, to identify the call home service, and indicate a request for a call to the caller's home station 6.

The method of Applicants' invention is illustrated in FIG. 2. The caller dials a calling card/speed calling call (Action Block 201). The local switch serving the caller connects the caller to a calling card call server switch (Action Block 203). The calling card call server queries the calling card data base, (Action Block 205), using the calling card number. The calling card data base responds with the identify of a speed dialed number or the caller's home station number, or information for identifying the caller's home switch, (Action Block 207). If necessary, the calling card server switch queries the caller's home switch to obtain a speed dial number, or speed dial list (Action Block 209). Action Block 209 is by-passed if the calling card's data base responds with the identify of a speed dialed number, or with a speed dialing list, or the identical of the caller's home station. The calling card server then completes the call to the number corresponding to the speed dial indication, or the home telephone number, (Action Block 211).

Figure 3:
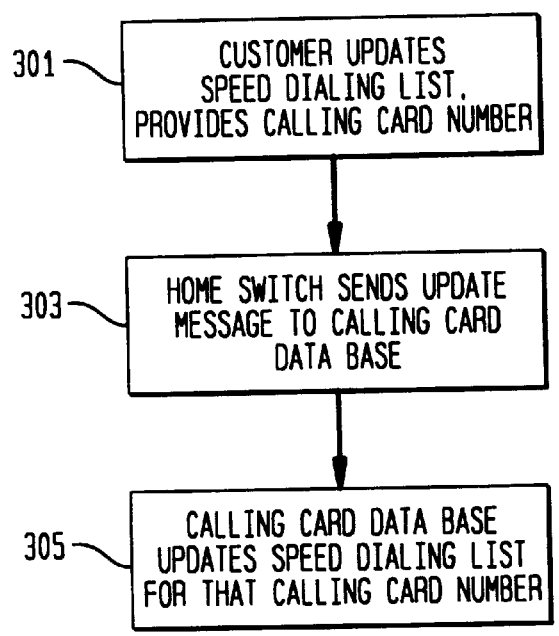
FIG. 3 is a flow chart illustrating the updating of a calling card data base.

If the calling card data base is to maintain a speed calling list, then the calling card data base must be updated whenever the basic speed calling list of the caller's home switch is updated. FIG. 3 illustrates this process, customer updates his/her speed dialing list, and is part of the updating procedure provides a calling card number, (Action Block 301). The home switch then sends an update message to the calling card data base, (Action Block 303), which then updates the speed dialing list for that customer's calling card number, (Action Block 305).

Many alternate embodiments of this invention will be apparent to those of ordinary skill in the art without departing from the scope of Applicants' invention. The invention is limited only by the attached Claims.

What is claimed is:

1. A method of providing speed calling service to a caller calling from a telephone station other than the station for which a speed calling list has been assigned, comprising the steps of:

receiving a calling card number, and a speed calling number from the caller;

querying a data base shared by a plurality of switches using said calling card number and said speed calling number to specify the query;

responding to the query with information for identifying a destination number corresponding to the caller's speed calling number; and completing the call to a number corresponding to the caller's dialed speed dialing number;

wherein said information provided by said calling card data base comprises information for identifying a home switch of said caller;

further comprising the step of querying said home switch of said caller to obtain speed calling numerical information corresponding to said speed calling number.

2. The method of claim 1, wherein said caller's speed dialing list includes the caller's home telephone number.

3. The method of claim 1, further comprising the step of: responding to the query with information for identifying the caller's home telephone number.

4. Apparatus for providing speed calling service to a caller calling from a telephone station other than the station for which a speed calling list has been assigned, comprising:

means for receiving a calling card number and a speed calling number from the caller;

means for querying a data base shared by a plurality of switches using said calling card number and said speed calling number to specify the query;

means for responding to the query with information for identifying a destination number corresponding to the caller's speed calling number; and means for completing the call to a number corresponding to the caller's dialed speed dialing number;

wherein said information provided by said calling card data base comprises information for identifying a home switch of said caller;

the apparatus further comprising:
   means for querying said home switch of said caller to obtain speed dialing numerical information corresponding to said speed dialing number.

5. The apparatus of claim 4, wherein the means for responding to the query further comprise means for responding with the caller's home telephone number, and the means for completing the call comprise means for completing the call to the caller's home telephone number supplied in response to the query.

6. The apparatus of claim 4, wherein the speed calling list stored in the database, comprises the caller's home telephone number.

* * * * *